United States Patent
Inoue

[11] Patent Number: 5,868,895
[45] Date of Patent: Feb. 9, 1999

[54] METHOD AND APPARATUS FOR BONDING SHEET-LIKE ADHESIVE

[75] Inventor: Yuichi Inoue, Osaka, Japan

[73] Assignee: Nitto Denko Corporation, Osaka, Japan

[21] Appl. No.: 798,059

[22] Filed: Feb. 11, 1997

[30] Foreign Application Priority Data

Mar. 1, 1996 [JP] Japan ................................. 8-071358

[51] Int. Cl.$^6$ ............................ B32B 31/08; C09J 7/00
[52] U.S. Cl. ...................... 156/324; 156/332; 156/381
[58] Field of Search .................... 156/381, 324, 156/332

[56] References Cited

U.S. PATENT DOCUMENTS

| | | | |
|---|---|---|---|
| 1,989,388 | 1/1935 | Watkins | 156/106 |
| 2,128,739 | 8/1938 | Connor | 156/381 |
| 2,200,554 | 5/1940 | Kampfer | 156/381 |
| 2,355,696 | 8/1944 | Bartell | 156/104 |
| 2,521,470 | 9/1950 | Matheson | 156/308.6 |
| 4,096,018 | 6/1978 | Hardt | 156/381 |
| 4,451,312 | 5/1984 | Nolte | 156/381 |
| 4,466,853 | 8/1984 | Hartmann | 156/381 |
| 4,842,900 | 6/1989 | Miyamoto | 427/348 |

FOREIGN PATENT DOCUMENTS

| | | |
|---|---|---|
| 48491 | 3/1982 | European Pat. Off. . |
| 730952 | 9/1996 | European Pat. Off. . |
| 9319855 | 10/1993 | WIPO . |

*Primary Examiner*—Daniel Stemmer
*Attorney, Agent, or Firm*—Sughrue, Mion, Zinn, Macpeak & Seas, PLLC

[57] ABSTRACT

A cover provided to partly enclose a pair of bonding rollers is supplied with a gas such as carbon dioxide having high solubility in an adhesive to be used and a sheet-like adhesive or an adhesive in a sheet form is bonded to a support film.

11 Claims, 3 Drawing Sheets

METHOD AND APPARATUS FOR BONDING SHEET-LIKE ADHESIVE

BACKGROUND OF THE INVENTION

1. Field of the Invention

The present invention relates to a method and an apparatus for bonding with sheet-like adhesives, more particularly, to a method and an apparatus that enables the sheet-like adhesives to be bonded to various types of adherends without leaving voids at the interface.

2. Description of the Prior Art

Adhesives having versatile functions and shapes are currently used in a wide range of industrial fields to achieve various purposes. These many adhesives are in most cases spread in thin layers on supports to take a sheet-like form. The resulting sheet-like adhesives are bonded to various adherends depending on the specific purpose of use.

Not only in the use of sheet-like adhesives but also in the manufacture of adhesive products, the bonding of sheet-like adhesives is a common practice in both consumer and industrial areas. For example, polyvinyl adhesive tapes which are the most common sheet-like adhesive are shipped in a roll form. Such adhesive tapes are usually manufactured by applying adhesive solutions onto sheets of soft polyvinyl chloride resins and drying the applied coasts and the resulting sheets (sheet-like adhesives) are rolled on themselves, with the adhesives being bonded to the back side of polyvinyl chloride resin sheets.

Forming adhesives on supports to make sheet-like adhesives which are then bonded to release bases, or first forming adhesives on release bases to make sheet-like adhesives which are then bonded to supports, is a common practice in the ordinary manufacturing process.

To give a further example, double-coated adhesive tapes are manufactured by bonding two sheet-like adhesives together, with paper being interposed as a support. Thus, it is a common and routine practice in the use and manufacture of adhesive products to bond sheet-like adhesives to various kinds of adherends.

FIG. 5 is a schematic representation of adhesive tape manufacture in an exemplary case of bonding a film-like support (support film) to a sheet-like adhesive having an adhesive formed on a release base. In a bonding apparatus generally indicated by D in FIG. 5, a roll of support film 2 is unwound and fed into the nip between a pair of bonding rollers 4 past a roller 5 under a specified tension. A sheet-like adhesive 1 having an adhesive formed on a release base is similarly fed into the nip between the same pair of bonding rollers 4 past a roller 3 under a specified tension. The thus fed support film 2 and sheet-like adhesive 1 are held between the bonding rollers 4 so that they are bonded together by a specified bonding force. The resulting adhesive tape 7 is past under two rollers 6 to be wound up in a roll form.

Should voids occur between the sheet-like adhesive and the support providing the adhered during the manufacturing process just described above, various inconveniences will result. For example, extensive formation of voids will induce lower adhesion strength, which eventually affects the anchoring force as exemplified by separation of the sheet-like adhesive from the support during use of the finished product.

The following additional examples may be mentioned: if voids occur when the adhesive tape is attached to a smooth surface, the back side of the tape will have asperities which give only an undesirable appearance to the tape; if voids occur between the tape and the surface of an electronic component to be fixed, the dimensional precision of the finished product will be lost; with a rough adherend, voids will turn into an infinite number of air bubbles, which again cause poor appearance.

The occurrence of voids at the interface between a sheet-like adhesive and the adherend is by no means exceptional but frequently observed in ordinary bonding procedures. Consider, for example, the case of bonding a cellophane adhesive tape onto a smooth glass plate; this would appear to be a comparatively simple job, but in reality it involves considerable difficulty in bonding the tape manually to ensure that no voids (air bubbles) will be entrapped between the glass surface and the adhesive side. If the bonding operation is performed mechanically, voids are less likely to occur than when it is performed manually but, depending on the operating conditions or the type of the adhesive used and the adherend to which it is applied, voids may occasionally occur as when excessive vibrations occur to the bonding rolls, used for continuous bonding, or when the bonding pressure is weak and not uniform or when the adherend is a rough surface.

If the occurrence of such voids is not tolerable, appropriate actions are taken depending on the specific cause of the trouble. If the cause is the vibration of bonding rollers and other components of the bonding machine, it is effective to increase the precision and strength of the machine; if the bonding pressure is unduly weak, setting it on the higher side is effective; if the adherend is a rough surface, it would be effective to set the bonding pressure at a higher level, set the bonding speed at a slower value or taking any other action to increase the chance of the adhesive of getting into the low spots of the irregularities of the adherend.

However, these conventional methods not only are limited in effectiveness but also economically disadvantageous as typified by high initial investment cost.

Particularly in the case of a rough adherend, it is difficult to eliminate all voids present by the aforementioned mechanical actions. In addition, if the rough adherend has a complex shape as in the case where it is formed of a fibrous material, it is extremely difficult to ensure that the voids which occur in the bonding operation are totally eliminated by the above-described mechanical treatments.

SUMMARY OF THE INVENTION

The present invention has been accomplished in the light of the aforementioned defects of the prior art methods and has as a general object of ensuring that a sheet-like adhesive can be bonded to an adherend employing simple means without forming voids and has as a specific object of providing a method and an apparatus that is also effective in the case where the adherend is complexly shaped.

The present inventors conducted intensive studies in order to develop a method for bonding sheet-like adhesives to adherends without forming voids; as a result, they found that the stated object could be attained by performing the bonding operation in an atmosphere filled with a gas having high solubility in the adhesive used. The present invention has been accomplished on the basis of this finding.

As already mentioned, the sheet-like adhesive side sometimes fails to adhere to the adherend, whereby voids are formed between the two surfaces either for a mechanical reason or because the adherend is a rough surface. The bonding operation is usually performed in air and, hence, the voids formed are filled with air. In this case, air remains in the gaseous state since its solubility in the adhesive is low and, hence, the voids will not disappear.

In contrast, the bonding method of the invention is characterized in that the sheet-like adhesive is bonded to the adherend in an atmosphere filled with a gas having high solubility in the adhesive and, therefore, if voids occur between the sheet-like adhesive and the adherend during the bonding operation, they will be filled with the gas having high solubility in the adhesive. After the bonding operation, the filling gas will dissolve in the adhesive which, in turn, will spread to fill every part of the voids; as a result, all voids will disappear, thereby enabling the sheet-like adhesive to be bonded to the adherend without leaving any voids behind between the two surfaces.

As will be understood from the above explanation, the bonding method of the invention is particularly effective in the case where the adherend is a rough surface. In a conventional approach which sets the bonding pressure at a sufficiently high level to allow the adhesive to be pushed into low spots of the irregularities, the adhesive will serve as a cap on the low spots of the adherend and the air remaining in the low spots has no place to escape, with the result that the voids remain unremoved. This problem is particularly noticeable if the rough surface has a considerable degree of irregularities and, hence, the conventional method has had limited effectiveness. In contrast, the gas remaining in low spots in the practice of the invention has such high solubility in the adhesive that it will dissolve in the latter which, in turn, will fill every part of the low spots. Accordingly, the method of the invention will always prove effective regardless of the geometry of the rough surface provided by the adherend.

The term "sheet-like adhesive" as used herein embraces a broad concept including not only those adhesives which themselves are formed as a sheet but also the case where the adhesive is formed as a sheet on various supports or release bases. Generally, the adhesive is formed as a sheet of a substantially uniform thickness ranging from several micrometers to several millimeters.

According to the bonding method of the invention, the air within the voids that occur during the bonding operation will dissolve in the adhesive to ensure that no voids will eventually remain in the joint. Therefore, the invention will exhibit its effect fully in the case where the adhesive will flow to undergo a reasonable amount of deformation after the bonding operation and this condition is satisfied by those materials which are generally known as "adhesives".

In addition, the invention method permits gases of high solubility to be selected depending on the type of the adhesive used and, hence, it can be applied to a broad range of adhesives. For example, acrylic adhesives, rubber-based adhesives and water-soluble adhesives may be employed.

Exemplary acrylic adhesives include polymers of monomers which are chiefly composed of acrylic monomers such as acrylic acid, butyl acrylate and octyl acrylate, and methacrylic monomers such as methacrylic acid, butyl methacrylate and octyl methacrylate.

Exemplary rubber-based adhesives include those which are based on rubber elastomers such as natural rubber, isoprene rubber, styrene-butadiene rubber, styrene-isoprene-styrene copolymer, silicone rubber and urethane rubber and which have mixed thereto softeners (e.g. liquid paraffin, silicone oil and the like which are selected as appropriate for the base polymer) and tackifying resins (e.g. rosin acids, rosin esters, silicone resins and the like which are selected as appropriate for the base polymer).

Exemplary water-soluble adhesives include watersoluble polymers such as poly(sodium acrylate), gelatin and poly(vinyl alcohol) which have softeners such as glycols and water thereto.

These adhesives may also be used in admixture with colorants, softeners, fillers, stabilizers and drugs for transdermal absorption.

Exemplary colorants include various kinds of organic and inorganic dyes and pigments; exemplary softeners include phthalic acid esters, long-chain aliphatic acid esters and liquid paraffin; exemplary fillers include silica gel, calcium carbonate and carbon black; stabilizers include antioxidants, UV absorbers, pH modifiers and antiseptics. Any drugs for transdermal absorption may be employed irrespective of whether they are for topical or systemic application and they can be formulated as tape preparations that permit the drug to be absorbed transdermally for the treatment and prevention of various diseases.

These adhesives may be crosslinked and exemplary crosslinking methods include reacting benzoyl peroxide, polyfunctional isocyanate compounds, polyfunctional epoxy compounds, etc. with the adhesives, and copolymerizing the adhesives with small amounts of polyfunctional vinyl monomers.

The method of the invention can effectively be applied for the thickness range of adhesives in common adhesive products. To be specific, the method can be applied for adhesive thicknesses ranging from about several micrometers to several millimeters. The term "thickness of the sheet-like adhesive" as used herein means the net thickness of the adhesive if it is formed as a sheet on the support or the like and this definition will apply in the following description.

However, in the case where the method of the invention is to be applied to a rough adherend, if the thickness of the sheet-like adhesive to be bonded is unduly small compared to the irregularities of the rough surface, it is difficult to eliminate all voids present and the invention will sometimes fail to fully exhibit the intended effect. This is because the voids forming at the initial stage of the bonding operation becomes relatively larger in volume than the adhesive, making it difficult on one hand to ensure that the gas in the voids will completely dissolve in the adhesive and making it impossible on the other to ensure a sufficient amount of the adhesive fills the irregularities of the rough surface.

The limit of-the surface roughness beyond which the bonding method of the invention is no longer effective varies with the object of implementing the invention and the physical properties of the adhesive and it cannot be determined uniquely by the surface roughness of the adherend and the thickness of the adhesive layer; however, it can safely be stated that isatisfactory results are achieved if the maximum height (Rmax) of the rough surface is smaller than the thickness of the sheet-like adhesive layer.

Most of the sheet-like adhesives which are to be bonded to the adherend are often superposed on the support and, even in this case, the bonding method of the invention can be implemented irrespective of the type, properties and other factors of the support.

Exemplary supports include plastic films such as those of polyethylene, vinyl chloride resins, polyesters, nylons, polypropylenes, polyurethanes and polyamides, as well as paper, woven fabrics, nonwoven fabrics, metal foils and sheets. These supports may be used either singly or with one support superposed on another. Supports may be coated with silicone resins and the like on the back side to ensure easy release in use and this embodiment can also be practiced with satisfactory results.

The term "adherend" as used herein covers all surfaces to which the sheet-like adhesive is to be bonded. In the narrow sense of the term, "adherend" means only the surface to which an adhesive product of interest is finally adhered; however, in the present invention, the term shall be construed more liberally to include all surfaces to which the sheet-like adhesive is to be bonded in the process of adhesive tape manufacture, including the surface of process paper to which the adhesive will be adhered temporarily. Therefore, the back side of the support to which the sheet-like adhesive has been bonded, as exemplified by the case of taking up the adhesive product in a roll form, is also included within the definition of the term "adherend".

The method of the invention is effective not only in the case where the adherend is a smooth surface but also when it is a rough surface. If the substrate is porous with the pores extending through the mass to the other side, voids will rarely form between the sheet-like adhesive and the adherend but, even in this case, the invention method will prove effective and the sheet-like adhesive can be bonded to the adherend without forming voids at the interface.

As already mentioned, the method of the invention will prove particularly effective when it is applied to adherends that are not only rough surfaces but also complexly shaped as in the case where they are formed of fibrous materials. If the adherend is a smooth surface, the formation of voids can be prevented by mechanical measures; however, if the adherend is a rough surface, it is difficult to prevent void formation by mechanical measures alone and the method of the invention has to be applied in order to ensure that the sheet-like adhesive can be bonded to rough surfaces with results that are as good as when it is bonded to smooth surfaces.

In particular, if the substrate is formed of fibrous materials such as nonwoven fabrics, paper and woven fabrics, the shape of the adherend is so complex that it is very difficult to prevent void formation by mechanical means; however, the method of the invention can achieve the intended result with ease.

The method of the invention is also applicable to the case where the sheet-like adhesive is to be bonded to the adherend of a matted or embossed film or that of a substrate in the form of a laminate of a nonwoven fabric and a film.

The bonding method of the invention is characterized in that the bonding operation is performed in an atmosphere filled with a gas having high solubility in the sheet-like adhesive and as long as this requirement is met, the bonding method is not limited in any particular ways and can be applied to various cases including, for example, the case where an adhesive tape is bonded to the adherend continuously using bonding rollers and the case where the sheet-like adhesive is manually bonded to the adherend.

It should, however, be noted that the invention method requires the maintenance of an atmosphere filled with a gas having high solubility in the adhesive, so a particular advantage and great benefits will result if the method is applied to the case of bonding the adhesive to a large number of substrates by mechanical means.

The following are exemplary cases to which the invention method can be applied with advantage: the manufacture of an adhesive sheet comprising a support, an adhesive and a release base, particularly, the step in which the sheet-like adhesive formed on the release base is bonded to the support; the manufacture of a roll of adhesive tape, particularly, the step in which the sheet-like adhesive formed on the support is bonded to the back side of the support as said adhesive is taken up in a roll form; the manufacture of a double-coated tape, particularly, the step in which a sheet having the adhesive and a paper base superposed on the release base is bonded to a sheet-like adhesive superposed on another release base; and the step in which an indicator adhesive sheet having a bar code or any other indications printed thereon is bonded to various kinds of products.

The method of invention can be easily implemented in various manners, one of which comprises enclosing the bonding operation site with a suitable cover, filling the interior of the cover with a gas which is highly soluble in the adhesive and performing the bonding operation. A continuous bonding operation is possible if the sheet-like adhesive and the substrate are supplied through an opening in the cover such that the bonding operation is performed within the cover. In this case, the concentration of the gas within the cover can be maintained at the necessary level by keeping the supply of an appropriate amount of the gas into the cover.

Needless to say, these are not the only ways to implement the method of the invention and its object can be attained as long as the concentration of the highly soluble gas can be maintained at a certain level and above within the atmosphere of the bonding operation and if appropriate conditions are available, there is no need to install the cover or other special parts and the invention method may be implemented by merely supplying the highly soluble gas to the neighborhood of the bonding operation site.

The key to the success of the invention is to select the highly soluble gas in accordance with the specific type of the adhesive used. Most commonly used adhesives are hydrophobic ones such as acrylic, rubber-, silicone- and urethane-based adhesives and examples of the gases that have highly solubility in these adhesives and which, hence, are preferred are natural gases such as ethane, propane and butane, as well as carbon dioxide. With water-soluble adhesives that are to be used in limited applications, ammonia and carbon dioxide are highly soluble and, hence, preferred.

As opposed to these gases, air, oxygen, nitrogen, hydrogen, helium and argon have only low solubility in adhesives and, hence, are not suitable for use in the bonding method of the invention.

The applicable gases mentioned above may be used either independly or in admixture. Nitrogen and oxygen which are two major components of the air atmosphere are generally low in solubility in adhesives and, hence, mixing them with the applicable gases listed above should preferably be avoided. However, depending on the use of a particular adhesive product and the specific bonding conditions, nitrogen and oxygen may be added in amounts up to about 50 v/v % without causing any significant problems. Stated more specifically, certain adhesive products may not be adversely affected in quality even in the presence of small amounts of residual voids; what is more, if the sheet-like adhesive yet to be bonded to the substrate is not completely saturated with nitrogen or oxygen, they may occasionally dissolve to some extent in the adhesives. Therefore, in these cases, the gases having high solubility in the adhesive may be mixed with a certain amount of the air atmosphere without causing any troubles in the practice of the invention.

As described above, various gases can be employed in the invention method depending on the type of adhesive used and from the viewpoint of economy, ease of implementation, safety and handling, the use of carbon dioxide is particularly desirable. Carbon dioxide is extensively used in gas containers or in a solid form (dry ice) and it is less expensive and more readily available than other gases. In addition, it is easy to handle and has neither strong toxicity nor irritancy, thus ensuring an outstanding safety feature for the operating personnel; furthermore, carbon dioxide which is nonflammable involves no fire or explosion hazard.

As a further advantage, carbon dioxide has high solubility in many kinds of adhesives including hydrophobic ones such as acrylic, urethane-, rubber- and silicone-based adhesives and, hence, it has a wide range of applicability. For these reasons, carbon dioxide is best suited to the purpose of the invention.

DETAILED DESCRIPTION OF THE PREFERRED EMBODIMENTS

Figure 1:
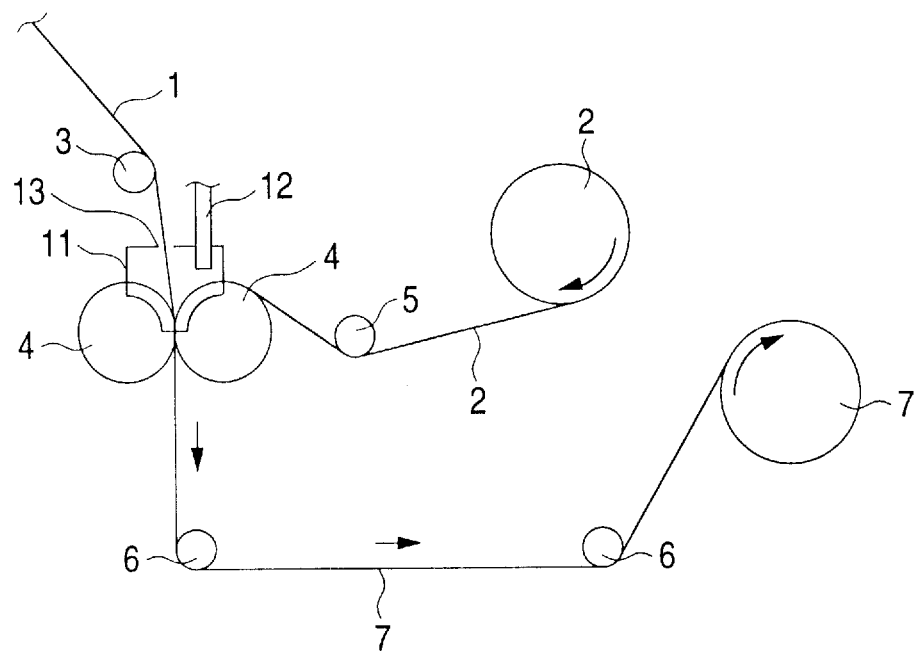
FIG. 1 is a schematic illustration of an embodiment of the present invention.
Figure 3:
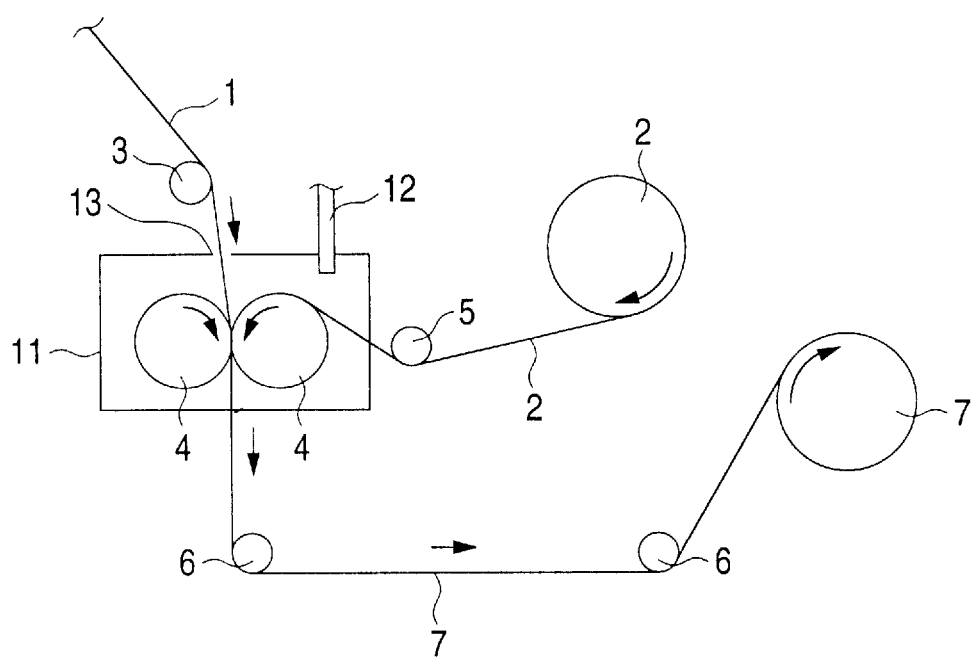
FIG. 3 is a schematic illustration of another embodiment of the invention.
Figure 2:
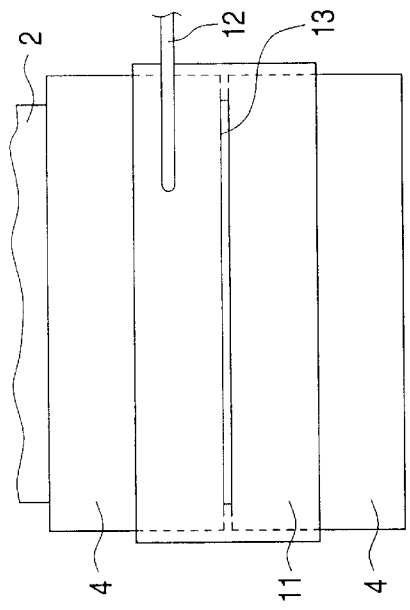
FIG. 2(a) is a front view showing enlarged the bonding operation site of a bonding apparatus to implement the method illustrated in FIG. 1.
FIG. 2(b) is a corresponding side view.
FIG. 2(c) is a corresponding plan view.
Figure 2:
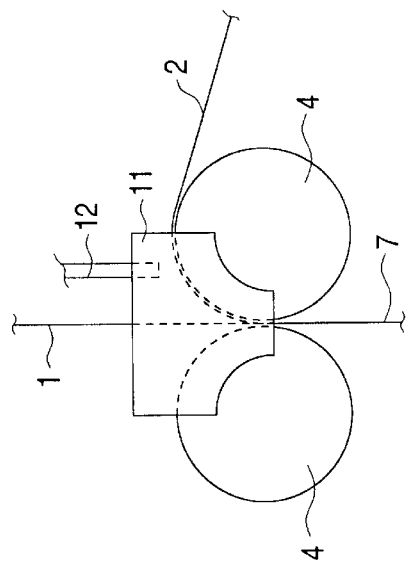
Figure 2:
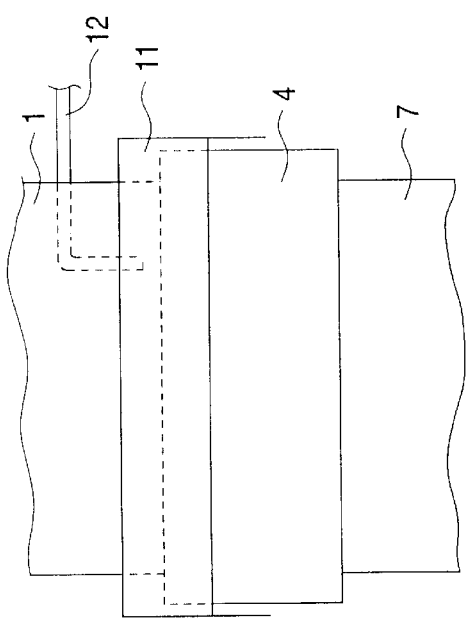
Figure 4:
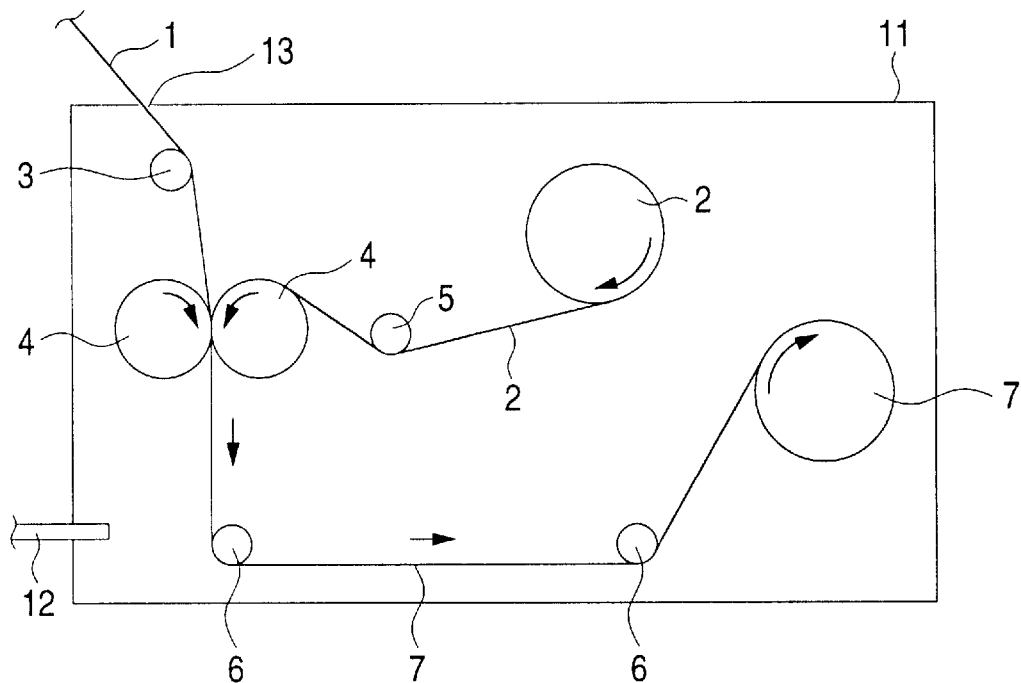
FIG. 4 is a schematic illustration of yet another embodiment of the invention.

The bonding method and apparatus of the present invention will now be described in detail with reference to FIGS. 1 to 4. FIG. 1 is a schematic illustration of an embodiment of the bonding method of the invention. FIGS. 2(a) to 2(c) show enlarged the bonding operation site of a bonding apparatus to be used in the invention, in which FIG. 2(a) is a front view, FIG. 2(b) is a side view and FIG. 2(c) is a plan view. FIG. 3 is a schematic illustration of another embodiment of the bonding method. FIG. 4 is a schematic illustration of yet another embodiment of the bonding method.

Figure 5:
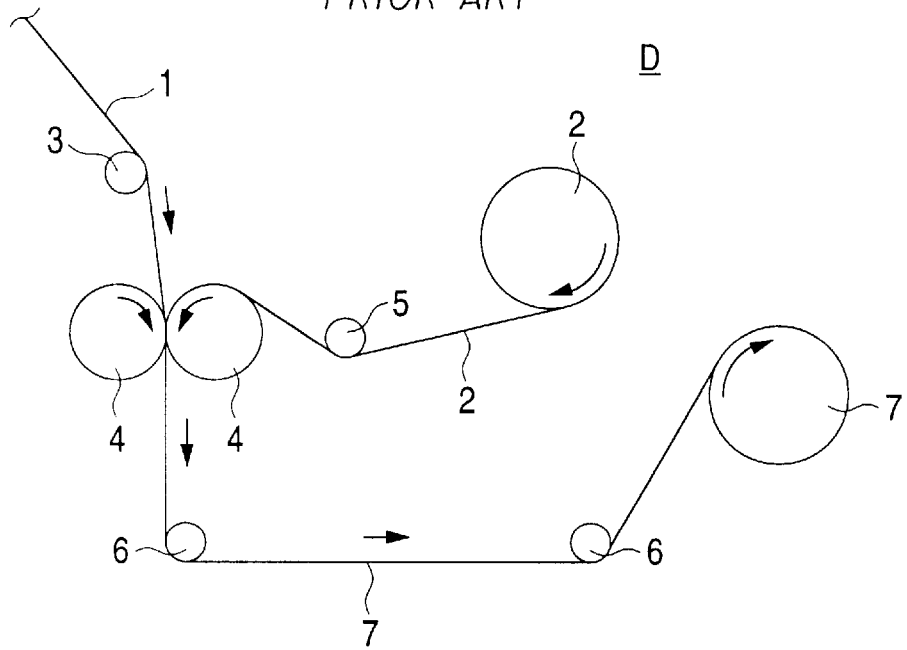
FIG. 5 is a schematic. illustration of a prior art method of bonding a sheet-like adhesive to an adherend.

The bonding method of the invention can be implemented in substantially the same steps as in the conventional manufacturing process and the only requirement that need be satisfied is that the operating atmosphere in which the sheet-like adhesive is bonded to the support and the like be filled with a gas having high solubility in the adhesive to be used. FIG. 1 shows a step which is essentially the same as in the prior art case shown in FIG. 5 in that a sheet-like adhesive 1 having an adhesive superposed on a release base is continuously bonded to a support film 2 to thereby produce a continuous sheet-like adhesive tape 7. The difference from the prior art case is that a bonding apparatus indicated by A in FIG. 1 has a cover 11 provided above a pair of bonding rollers 4 in such a manner that the bonding operation can be performed in a gas atmosphere having high solubility in the adhesive and that the highly soluble gas is fed into the cover 11 to ensure that the neighborhood of the bonding operation site is filled with said gas.

As specifically shown in FIGS. 2(a) to 2(c), the cover 11 is provided above the pair of bonding rollers 4 in such a way that it covers at least those portions of the rollers which are functional in bonding the sheet-like adhesive 1 to the support film 2. A slit 13 is made in the top of the cover 11 to provide an opening through which the sheet-like adhesive 1 can pass. The top of the cover 11 is also provided with a pipe 12 for supplying the highly soluble gas into the cover 11.

The cover 11 is typically formed of a plastic material such as a transparent acrylic resin plate or a metallic material and the constituent material of the cover is not limited to any particular types. The size of the cover also is not limited to any particular value but it should be large enough to cover at least the bonding operation site such that the gas will reach every part of the area where the sheet-like adhesive 1 is bonded to the support film 2.

With the above-described design, the cover 11 is supplied with the highly soluble gas, such as carbon dioxide, that is forced through the pipe 12 by means of a pump (not shown). The sheet-like adhesive 1 running past a roller 3 is fed into the nip between the bonding rollers 4 through the slit 13 in the cover 11 under a suitable pulling force. At the same time, the support film 2 in a roll form is unwound and as it runs past a roller 5, it is fed into the nip between the bonding rollers 4 via the lower rear end of the cover 11 under a suitable pulling force. The thus supplied sheet-like adhesive 1 and support film 2 are bonded by means of the rollers 4 under a constant bonding force to make up the sheet-like adhesive tape 7 which, in turn, travels past two rollers 6 to be taken up in a roll form which is also indicated by 7 in FIG. 1.

With the neighborhood of the bonding operation site being thusly enclosed with the cover 11, the bonding operation can be performed in an atmosphere filled with the gas having high solubility in the adhesive. In the illustrated method, the cover 11 is installed only in the neighborhood of the bonding operation site and, hence, the overall size of the bonding apparatus is not unduly increased and the invention can be implemented by merely adopting a simple modification of the conventional manufacturing apparatus indicated by D in FIG. 5.

In the embodiment shown in FIG. 3, the bonding rollers 4 in the bonding apparatus indicated by B are completely enclosed with the cover 11 such that the adhesive tape 7 formed by bonding the sheet-like adhesive I to the support film 2 is drawn out of the cover 11 through a slit made in its bottom. In the first embodiment, only the neighborhood of the bonding operation site is enclosed with the cover 11, so a gap will be formed between the cover 11 and the opposed end of each bonding roller 4 and, in addition, the bottom of the cover 11 is open; as a result, the gas fed into the cover 11 will partly escape and constant amount of the gas must be kept supplied into the cover 11 in order to make up for the loss of the gas but then the operating cost will increase. In the example shown in FIG. 3, the pair of bonding rollers 4 are completely enclosed with the cover 11 so that the gas supplied into the cover 11 is less likely to escape, thereby providing ease in maintaining the desired gas atmosphere in the bonding operation site. This offers the added advantage of reducing the amount of the gas that need be constantly supplied into the cover 11.

In the embodiment shown in FIG. 4, the step of bonding operation is wholly placed within an atmosphere filled with the highly soluble gas and, more specifically, the bonding apparatus indicated by C in FIG. 4 is totally enclosed with the cover 11. In the illustrated case, the sheet-like adhesive 11 is supplied from the outside of the cover 11 but, needless to say, it may be supplied from a source within the cover 11. If the entire part of the bonding apparatus is enclosed with the cover 11 as in the case shown in FIG. 4, there is substantially no need to worry about the formation of gaps between the cover 11 and the bonding apparatus and greater convenience is ensured in maintaining the desired gas. atmosphere in the operating site.

Of course, it is not absolutely necessary to provide the cover which is to be filled with the highly soluble gas and if the bonding apparatus to be used is small enough, a pipe alone may be installed near the top of the bonding rollers to ensure that the highly soluble gas is kept supplied to the area of interest.

As a specific example of the adhesive product, an adhesive tape was prepared using the bonding apparatus A shown in FIGS. 1 and 2(a) to 2(c) and it was compared with a comparative sample which was prepared in accordance with the prior art.

The adhesive tape as a specific example of the adhesive product was prepared using a bonding apparatus having the following specifications. A pair of bonding rollers consisted of two iron rollers each having a diameter of 25 cm and a width of 70 cm, with one of them being coated with a silicone rubber. A cover 5 mm thick that was made of an acrylic resin plate was positioned above the pair of bonding rollers in such a way that they were partly covered with the resin plate. The distance between the inner surface of each lateral side of the cover and the opposed end of each bonding roller was adjusted to be about 1 mm; the distance between the lower front end of the cover and the rotating surface of the opposed bonding roller and the distance between the lower rear end of the cover and the rotating surface of the opposed bonding roller were each adjusted to be about 1 mm; and the inner surface of the top of the cover was adjusted to be about 50 mm above the topmost surface of each bonding roller. A pipe having an inside diameter of 11 mm was installed in such a way that the gas outlet was of substantially the same height as the top surface of each bonding roller, and a rectangular slit was made in the top of the cover, measuring 20 mm in the direction of the thickness of the sheet-like adhesive layer and 640 mm in the direction of width.

The apparatus was kept supplied with carbon dioxide gas at a flow rate of about 10 L/min, with the bonding speed held constant at 5 m/min. Adhesive tapes were prepared under these conditions using various kinds of sheet-like adhesive and support film. Comparative samples of adhesive tape were prepared using an identical apparatus and identical materials, except that the bonding operation was not performed in a carbon dioxide atmosphere but in the air atmosphere.

Specific Embodiment 1

An adhesive consisting of 60 parts by weight of an octyl acrylate/acrylic acid copolymer (copolymerization ratio: 95/5 by weight) and 40 parts by weight of isopropyl myristate was superposed in a thickness of 60 $\mu$m on a 75-$\mu$m thick polyethylene terephthalate (PET) separator (release base) to form a sheet-like adhesive. A nonwoven polyester fabric prepared by a wet process (basis weight: 12 g/m$^2$) and a PET film were laminated to form a support film. The sheet-like adhesive was bonded to the support film in such a way that the adhesive side of the former was in contact with the nonwoven fabric side of the latter. As a result, there was produced a highly transparent adhesive tape having no voids (air bubbles) in it. On the other hand, the comparative adhesive tape prepared by bonding in the air was turbid in the adhesive surface due to the presence of tiny air bubbles.

Specific Embodiment 2

In this embodiment, an adhesive consisting of an octyl acrylate/acrylic acid copolymer (copolymerization ratio: 95/5 by weight) was superposed in a thickness of 60 $\mu$m on a 75-$\mu$m thick polyethylene terephthalate (PET) separator to form a sheet-like adhesive. A nonwoven polyester fabric prepared by a wet process (basis weight: 8 g/m$^2$) and a PET film were laminated to form a support film. The sheet-like adhesive was bonded to the support film in such a way that the adhesive side of the former was in contact with the nonwoven fabric side of the latter. As a result, there was produced a highly transparent adhesive tape having no voids (air bubbles) in it. On the other hand, the comparative adhesive tape prepared by bonding in the air was turbid in the adhesive surface due to the presence of tiny air bubbles.

Specific Embodiment 3

In this embodiment, an adhesive consisting of a mixture of 40 parts by weight of a styrene/isoprene/styrene block copolymer (SIS) rubber, 30 parts by weight of an alicyclic saturated hydrocarbon resin and 30 parts by weight of liquid paraffin was superposed in a thickness of 400 $\mu$m on a 100-$\mu$m thick polypropylene (PP) separator to form a sheet-like adhesive. A nonwoven polyester fabric prepared by a wet process (basis weight: 8 g/m$^2$) and a PET film were laminated to form a support film in such a way that the adhesive side of the former was in contact with the nonwoven fabric side of the latter. As a result, there was produced a highly transparent adhesive tape having no voids (air bubbles) in it. On the other hand, the comparative adhesive tape prepared by bonding in the air was turbid in the adhesive surface due to the presence of tiny air bubbles.

In order to further verify the effectiveness of the present invention, a adhesive tape was bonded to a rough adherend by a manual operation as follows.

Specific Embodiment 4

The interior atmosphere of a glove box was replaced by carbon dioxide gas and a commercial polypropylene adhesive tape was manually bonded to a matted polyester film within the glove box. No air bubbles were found to occur in the bonded sheet at the interface between the polyester film and the adhesive tape.

In accordance with the invention, a sheet-like adhesive or an adhesive in a sheet form is bonded to an adherend in an atmosphere filled with a gas having high solubility in the adhesive and this enables the sheet-like adhesive to be bonded to the adherend without forming voids between the adhesive and the adherend.

The invention method is particularly effective if the adherend is a rough surface as in the case where it is formed of a fibrous material and irrespective of the surface geometry of the adherend, the sheet-like adhesive can be bonded to the substrate without forming voids at the interface.

An acrylic adhesive may be used as the adhesive in a sheet form and it has the advantage of being applicable to the manufacture of many kinds of sheet-like adhesive products.

Carbon dioxide is preferably used as the gas having high solubility in the adhesive and this provides safety in bonding operations since it is easy to handle and has no explosion or fire hazard. In addition, carbon dioxide is applicable to many kinds of sheet-like adhesives including not only hydrophobic adhesives such as acrylic ones but also water-soluble adhesives.

What is claimed is:

1. A method for bonding a sheet-like adhesive comprising the steps of:

providing a sheet-like adhesive and an adherend; and bonding the adhesive to the adherend in an atmosphere filled with a gas having a higher solubility in the adhesive than does air, wherein the sheet-like adhesive is formed of an acrylic and the gas is carbon dioxide.

2. The method according to claim 1, wherein the adherend is a rough surface.

3. The method according to claim 2, wherein the maximum height (Rmax) of the rough surface is less than the thickness of the sheet-like adhesive layer.

4. The method according to claim 1, wherein the adherend is formed of a fibrous material.

5. The method according to claim 1, wherein the step of providing a sheet-like adhesive and an adherend includes providing a sheet-like adhesive having a drug therein.

6. The method according to claim 1, wherein the step of providing a sheet-like adhesive and an adherend includes providing a sheet-like adhesive having a colorant therein.

7. The method according to claim 1, further comprising the step of winding the bound sheet-like adhesive and adherend on a roll.

8. A method for bonding a sheet-like adhesive comprising the steps of:

provide a sheet-like adhesive and an adherend; and bonding the adhesive to the adherend in an atmosphere filled with a gas having high solubility in the adhesive, wherein the step of bonding the adhesive to the adherend comprises the steps of:

feeding the sheet-like adhesive through a slit in a cover provided over two nip rollers;

feeding the adhesive and the adherend between the two nip rollers; and providing a pulling force on the sheet-like adhesive and the adherend with the nip rollers.

9. The method according to claim 8, further comprising a step of providing gas, having a higher solubility in the adhesive than does air, to the cover at a flow rate of about 10 L/min.

10. The method according to claim 9, wherein the step of feeding the sheet-like adhesive and adherend to the nip rollers further comprises feeding the sheet-like adhesive and adherend to the nip rollers at the rate of 5 m/min.

11. The method according to claim 8, wherein the step of feeding the sheet-like adhesive and adherend between the nip rollers further comprises feeding the sheet-like adhesive and adherend between nip rollers which are entirely surrounded by an atmosphere containing a gas having a higher solubility in the adhesive than does air.

* * * * *